(12) United States Patent
Piehl et al.

(10) Patent No.: US 7,527,381 B2
(45) Date of Patent: May 5, 2009

(54) OPTICAL SYSTEM ARCHITECTURE

(75) Inventors: Arthur Piehl, Corvallis, OR (US);
Anurag Gupta, Corvallis, OR (US);
Scott Lerner, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 232 days.

(21) Appl. No.: 11/192,912

(22) Filed: Jul. 29, 2005

(65) Prior Publication Data

US 2007/0024811 A1   Feb. 1, 2007

(51) Int. Cl.
*G03B 21/00*   (2006.01)
*G03B 21/26*   (2006.01)

(52) U.S. Cl. .......................................... 353/31; 353/34
(58) Field of Classification Search ................. 348/758, 348/756, 757, 752; 353/31, 33, 20, 84, 94, 353/34; 349/5, 8, 9
See application file for complete search history.

(56) References Cited

U.S. PATENT DOCUMENTS

| | | | |
|---|---|---|---|
| 6,406,148 B1 * | 6/2002 | Marshall et al. | 353/31 |
| 6,650,377 B2 * | 11/2003 | Robinson et al. | 349/9 |
| 2003/0174293 A1 * | 9/2003 | Hubel et al. | 353/84 |
| 2005/0134805 A1 * | 6/2005 | Conner et al. | 353/46 |
| 2006/0119796 A1 * | 6/2006 | Drazic et al. | 353/31 |
| 2007/0126992 A1 * | 6/2007 | Penn | 353/84 |

* cited by examiner

*Primary Examiner*—Hung Henry Nguyen (57) ABSTRACT

A projection system is disclosed that has a chromaticity/luminosity module in serial optical communication with a luminosity module. The chromaticity/luminosity module has a pair of chromaticity/luminosity modulators configured to modulate incident light to generate color on a pixel-by-pixel basis. The luminosity module has a pair of luminosity modulators configured to modulate incident light to generate a light image.

28 Claims, 6 Drawing Sheets

OPTICAL SYSTEM ARCHITECTURE

BACKGROUND

Image projection devices are widely used today in many electronic applications, such as televisions, computers, and projectors. These projection devices may employ any of several relatively new types of luminosity modulators, such as Digital Light Processing ("DLP"), Liquid Crystal Display ("LCD"), and Liquid Crystal on Silicon ("LCOS") microdisplays to project an image onto a viewing medium, such as a television viewing panel, screen, wall, etc.

While each of these different types of luminosity modulators improves overall brightness, contrast, and resolution over prior vacuum tube, transistor, and slide projector technology, each has its own distinct drawbacks that affect the image produced on the screen. For example, a DLP microdisplay typically provides images in black and white and cooperates with hardware such as chromatic modulators in the form of color wheels to produce a spectrum of colors. However, color wheels generally pass only a single color at any given time (effectively reducing the amount of light projection by the system) and DLPs may exhibit a lower resolution than its LCD and LCOS counterparts because of the larger pixel sizes DLPs employ.

The luminosity modulators that are polarization based, such as the LCD and LCOS modulators, require the prepolarization of light to achieve some contrast between the images displayed on the screen. Prepolarization, however, generally results in the loss of about half of the light produced by a light source for image projection. Polarization recovery systems may be added to the projection system, at an added cost, to recover much of the lost light. Even with the polarization recovery systems, these modulators still exhibit a relatively low contrast, which affects theater or low ambient light viewing. Also, for these modulators to modulate color, three separate modulators are used—one for the projection of each of the colors of red, blue, and green—or the use of sequential color which requires added hardware and a further reduction in efficiency.

Optical lenses are employed with the luminosity modulators to concentrate the light transmitted to and reflected from the particular luminosity modulators. Typically, one set of optical lenses, "illumination lenses," transmits the light to the luminosity modulators and a second set of optical lenses, "projection lenses," receives the reflected light from the luminosity modulators and projects the image on to a viewing medium. The use of multiple sets of lenses to separately accomplish illumination and projection adds significant complexity to the design of a projector or television as well as added costs to the overall system.

The embodiments described hereinafter were developed in light of this situation and the drawbacks associated with existing systems.

BRIEF DESCRIPTION OF THE DRAWINGS

The present embodiments will now be described, by way of example, with reference to the accompanying drawings, in which.

DETAILED DESCRIPTION

A system for projecting a light image onto a viewing surface is described herein. The system includes a luminosity module and a chromaticity/luminosity module in serial optical communication with each other to generate a colored light image that is projected to a viewing surface, such as a screen, wall, etc. The luminosity module modulates light intensity to generate a light image. The chromaticity/luminosity module modulates light to provide color to the light image. The system also includes at least one relay lens group that functions both to direct white light to one or the other of the modules, where the white light is modulated, and also to direct the modulated light to the other of the modules. The projection system described herein can be employed in a variety of different environments, including televisions, monitors, projectors, and a variety of other systems involving the generation and projection of light images.

Figure 1:
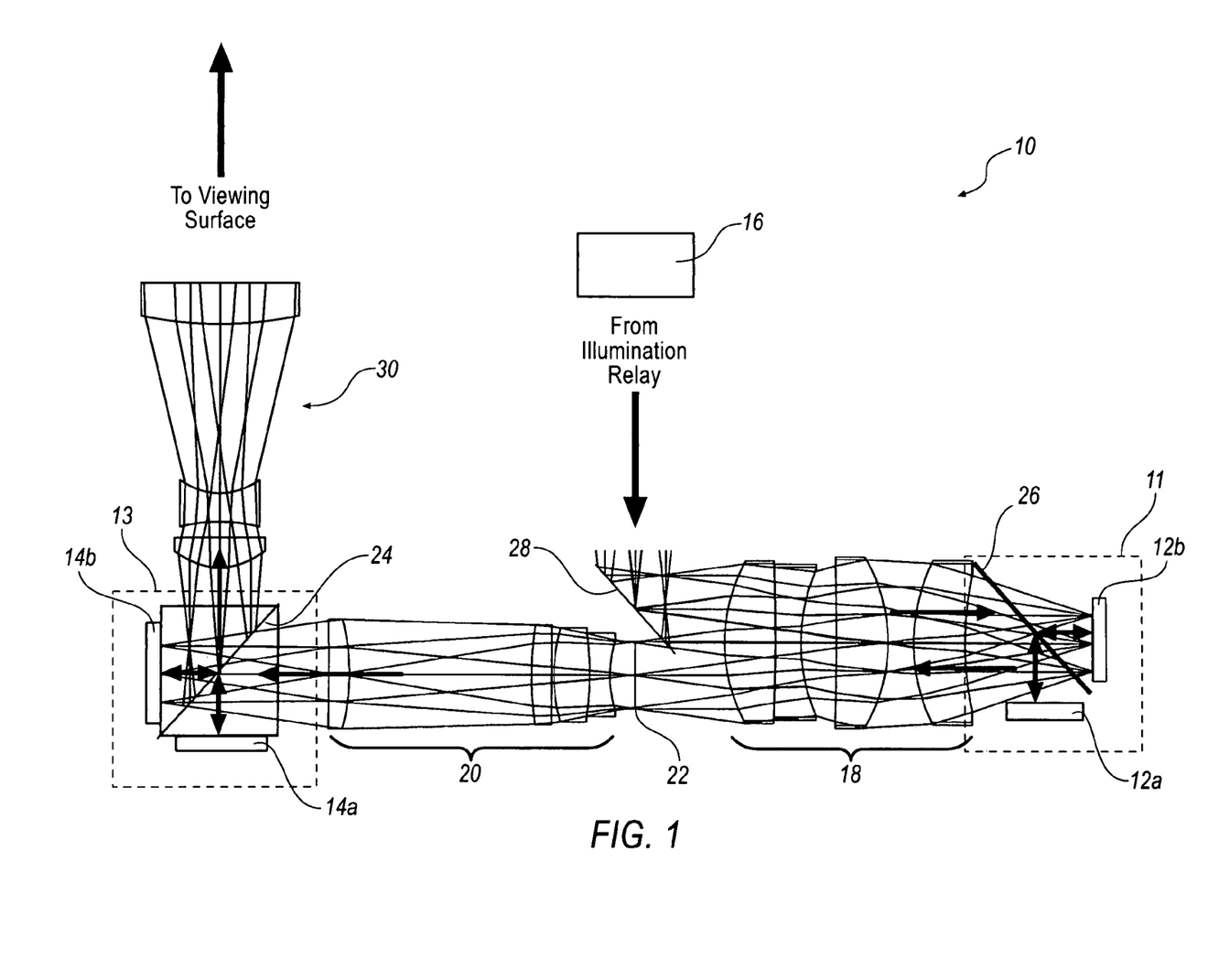
FIG. 1 is an optical schematic diagram of a projection system according to an exemplary embodiment.

FIG. 1 illustrates an exemplary embodiment of the projection system. The exemplary projection system 10 includes a light source 16, a reflecting surface 28, a chromaticity/luminosity module 11, a first relay lens group 18, a second relay lens group 20, a luminosity module 13, and a projection lens 30. In general, white light generated by the light source 16 is reflected and directed to the chromaticity/luminosity module 11 by reflecting surface 28 through first relay lens group 18. The chromaticity/luminosity module 11 modulates the white light in response to image source signals from a controller (not shown) to provide a desired color distribution for the light image. The colored light is reflected from the chromaticity/luminosity module 11 back through first relay lens group 18 and through second relay lens group 20 to the luminosity module 13. The luminosity module 13 modulates the intensity of the colored light in response to image source signals from a controller (not shown) to generate a colored light image. The colored light image is reflected from the luminosity module through the projection lens 30 to the viewing surface. The pupil plane 22 exists somewhere between the first relay lens group 18 and the second relay lens group 20. In some embodiments, the reflecting surface 28 is aligned with the pupil plane 22 (as shown in FIG. 1), which is beneficial to achieve the smallest size of the reflector 28. At pupil plane the beam bundle is the smallest. The chances of unintended mechanical interference between the reflector 28 and the beam bundles are greatly reduced. The first and second relay lens groups 18 and 20 are shown as each having a particular number of lenses. A person skilled in the art will recognize that the first and second relay lens groups 18 and 20 may have a variety of different number and configurations of lenses to make up the respective lens groups 18 and 20. Further, a variety of differently-configured projection lenses 30 can be used in connection with the disclosed projection system 10. The light source 16 may be, for example, an illumination relay. A person skilled in the art will further recognize that additional or replacement components could be incorporated into the system 10.

Chromaticity/luminosity module 11 includes a pair of chromaticity/luminosity modulators 12a and 12b and a dichroic beam splitter 26. Chromaticity/luminosity modulators 12a and 12b may include one or more pixelated, variable absorption backplanes, and other devices that can operate to modulate both light and color. The term "pixelated", used in conjunction with chromaticity/luminosity modulators herein, refers to a spatial light modulator, such as a chromaticity/luminosity modulator that has independently-controlled pixels so as to be able to spatially modulate light intensity/color. The chromaticity/luminosity modulators, 12a, 12b illustrated in FIG. 1 may be provided in a number of ways. For example, the variable absorption backplane may include an array of pixels where each pixel is composed of a top reflector and a bottom reflector separated by a distance T that defines an optical cavity therebetween. The optical cavity may utilize optical interference to reflect a wavelength band of electromagnetic radiation, including visible light. The intensity of the reflected wavelength band (e.g. red light) may be controlled by rapidly modulating the thickness of the optical cavity between substantial absorption and substantial reflection of the wavelength band. The wavelength band (e.g. red light) and/or the intensity may be selected in correspondence with one or more pixels of a display image, perhaps provided by an image source signal from a controller (not shown). In the embodiment illustrated in FIG. 1, chromaticity/luminosity modulators 12a, 12b do not require the prepolarization of light and may be positioned in an "off-axis" dichroic configuration. "Off-axis" means that the light incident to chromaticity/luminosity modulators 12a, 12b is not on the same axis as the actual modulators 12a, 12b themselves. The use of "off-axis" light also allows for the use of the first relay lens group 18 to be used simultaneously to both illuminate the chromaticity/luminosity modulators 12a, 12b and to project light from the chromaticity/luminosity modulators 12a, 12b, thereby providing increased flexibility to the design of the projection system.

In operation, white light enters the luminosity module 11 from first relay lens group 18. The dichroic beam splitter 26 divides the white light based upon wavelength, i.e., color, and correspondingly directs the divided light to the chromaticity/luminosity modulators 12a and 12b. Chromaticity/luminosity modulators 12a and 12b may be functionally divided in several ways, such as between one pixelated, variable absorption backplane 12a for modulating blue/green light, and one pixelated, variable absorption backplane 12b for modulating red light. That is, the white light may be divided such that red light is directed to one chromaticity/luminosity modulator 12a and blue/green light is directed to the other chromaticity/luminosity modulator 12b. The chromaticity/luminosity modulators 12a and 12b modulate the respective incident light, which is recombined by the dichroic beam splitter 26 and is reflected from the chromaticity/luminosity module 11 back through the first relay lens group 18 and through the second relay lens group 20. Each frame of light that exits the chromaticity/luminosity modulator 11 has been modulated such that each pixel of the frame is of the desired color for that pixel, according to the desired image ultimately to be displayed on the display surface.

Luminosity module 13 includes a pair of luminosity modulators 14a, 14b and a polarizing beam splitter (PBS) 24. In the embodiment illustrated in FIG. 1, luminosity modulators 14a, 14b are liquid crystal on silicon ("LCoS") microdisplays. LCOS microdisplays typically combine the liquid crystals employed in liquid crystal displays ("Lids"), a transmissive technology, with a reflective mirror (silicon) substrate. Each liquid crystal cell represents a single pixel in the LCOS technology. As light is projected onto the LCoS, it passes through each liquid crystal and is reflected by the mirror below. As the liquid crystal cells are electrically activated, as determined by the image to project, the light polarization state reflected from the cell is modulated. The liquid crystal cells may also be partially activated to modulate the polarization state to varying degrees. In FIG. 1, the polarizing beamsplitter 24 is the only polarization component used, and it acts as both the input polarizer for incoming light to luminosity modulators 14a, 14b and as an analyzer for the light being directed toward projection lens 30.

In operation, the colored light that illuminates the luminosity module 13 (from chromaticity/luminosity module 11) is split into two different polarizations, i.e., a P polarization and an S polarization, by the PBS 24. The P polarization light is directed to one of the luminosity modulators, e.g., 14a, and the S polarization light is directed to the other of the luminosity modulators, e.g., 14b. The luminosity modulators 14a, 14b modulate the impending polarized light in response to image source signals from a controller (not shown). The image source signals generally represent a desired light image to generate. The modulated polarized light from each of the luminosity modulators 14a, 14b is converted into modulated intensity by a polarizing "analyzer," which in this case is the PBS 24 that originally split the incoming light into two polarization states. In this way, the two luminosity modulators 14a, 14b operate in an optically parallel configuration. As such, luminosity modulators 14a, 14b can play equal roles as luminosity modulators and can be driven by the same voltages. The described operation modulates the colored light and projects an image. A single LCOS microdisplay may be employed to simply modulate light.

Figure 2:
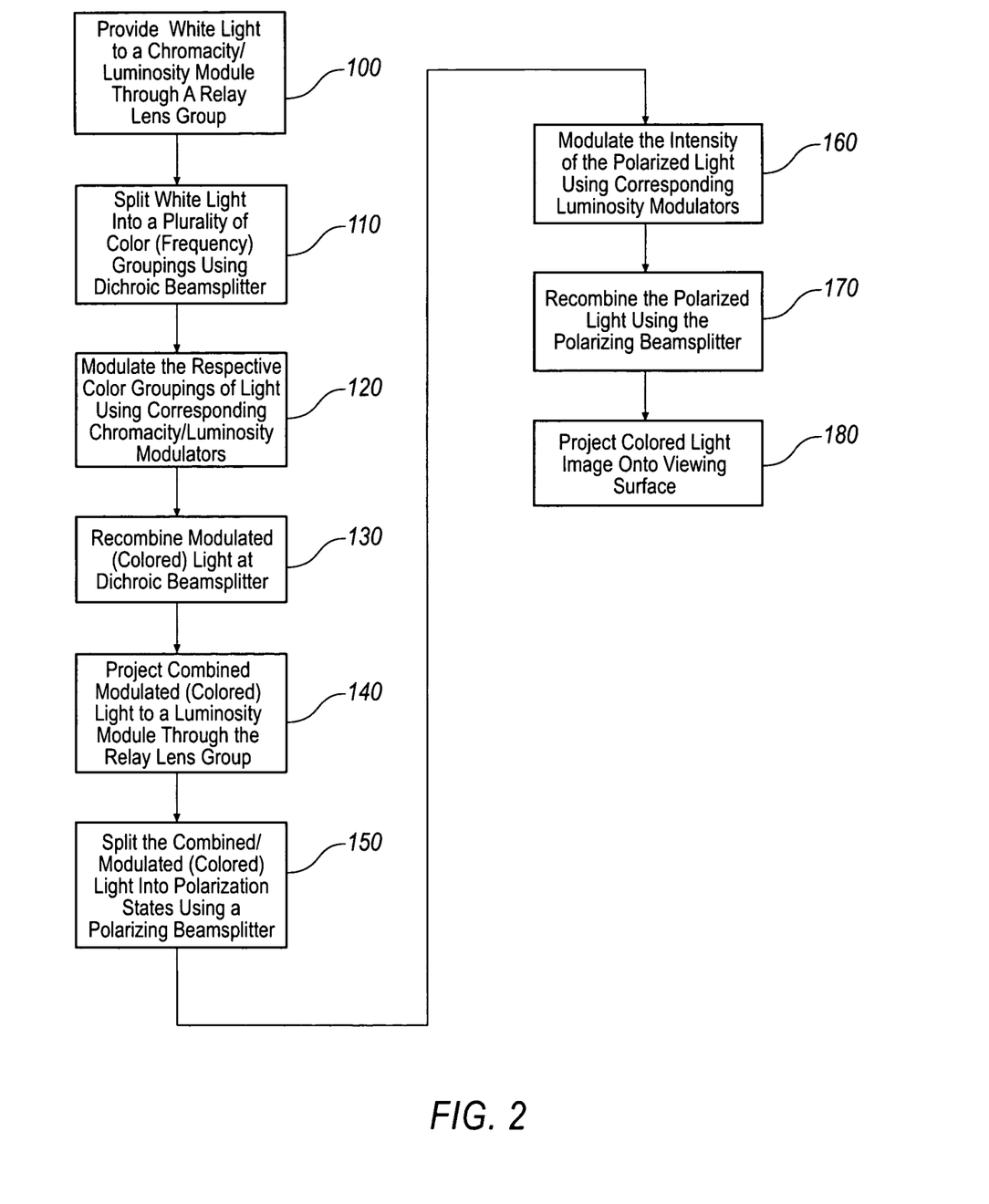
FIG. 2 is a flow diagram showing the steps in the projection of an image by the projection system of FIG. 1.

FIG. 2 illustrates in more detail an exemplary set of steps used in operation of the complete projection system 10 shown in FIG. 1. At step 100, white light is provided to chromaticity/luminosity module 11 through relay lens group 18. At step 110, that white light is split into a plurality of color (frequency) groupings using dichroic beam splitter 26. At step 120, the color groupings are directed to respective chromaticity/luminosity modulators 12a, 12b, which modulate the light to generate color for the image to be projected by the system. At step 130, the modulated light is recombined by the dichroic beamsplitter 140. The combined light is projected to the luminosity module 13 by relay lens group 18 at step 140. At step 150, that light is split into polarization states P and S by polarizing beam splitter 24. At step 160, the polarized light is directed to respective luminosity modulators 14a, 14b, which modulate the impending light to generate the light image to be projected to the viewing surface. At step 170, the modulated light is recombined by the polarizing beam splitter 24. Finally, at step 180, the colored light image is projected onto the viewing surface.

The projection system 10 described in connection with FIGS. 1 and 2 have several benefits over known systems. LCOS microdisplays are known in the art for producing images with very high resolution and sharpness. The image produced by LCoS microdisplays also tends to look "smoother" than an image produced by a digital light processing ("DLP") microdisplay. However, LCOS microdisplays typically have a relatively low contrast and require multiple LCOS microdisplays to produce color. Optically coupling LCOS microdisplays (e.g. elements 14a and 14b) with the chromaticity/luminosity modulators 12a, 12b improves the contrast of the projected light image and eliminates the requirement for multiple LCOS microdisplays to generate color.

Because the chromaticity/luminosity module 11 produces intrinsic color modulation functionality, there is flexibility in the way that color is managed in any given display system embodiment. As an example, in the case of a display system embodiment that utilizes a single variable absorption backplane, the variable absorption backplane may, (1) operate to produce a color filled sequential mode (e.g. RGB subframes displayed sequentially) directly at the variable absorption backplane, without requiring an upstream colorwheel or color switching device, or (2) operate to produce a full-color mode directly at the variable absorption backplane by independently controlling the optical path length within each pixel. Other display system embodiments and color management modes are also possible.

Positioning luminosity module 13 and chromaticity/luminosity module 11 in series, as shown in FIG. 1, permits the total available contrast to become approximately the product of the individual contrasts (noting the projector optics may limit the total contrast achieved). Because the potential available contrast is so high, tolerances required for optics that manage polarization in the system may be significantly relaxed compared to the tolerances required in designs that only employ a luminosity modulator. Also, configuring a pair of luminosity modulators such that they modulate the P and S states in parallel allows both light polarization states to be utilized rather than losing as much as half the light intensity with a single luminosity modulator. Because two luminosity modulators 14a and 14b are employed in this particular embodiment, inefficient polarization recovery systems do not have to be employed with projection system 10. Luminosity modulators 14a, 14b provide the improved brightness and resolution of an image while chromaticity/luminosity modulators 12a, 12b provide the improve contrast and color to further enhance the projected image versus other light and color modulating technologies.

Figure 3:
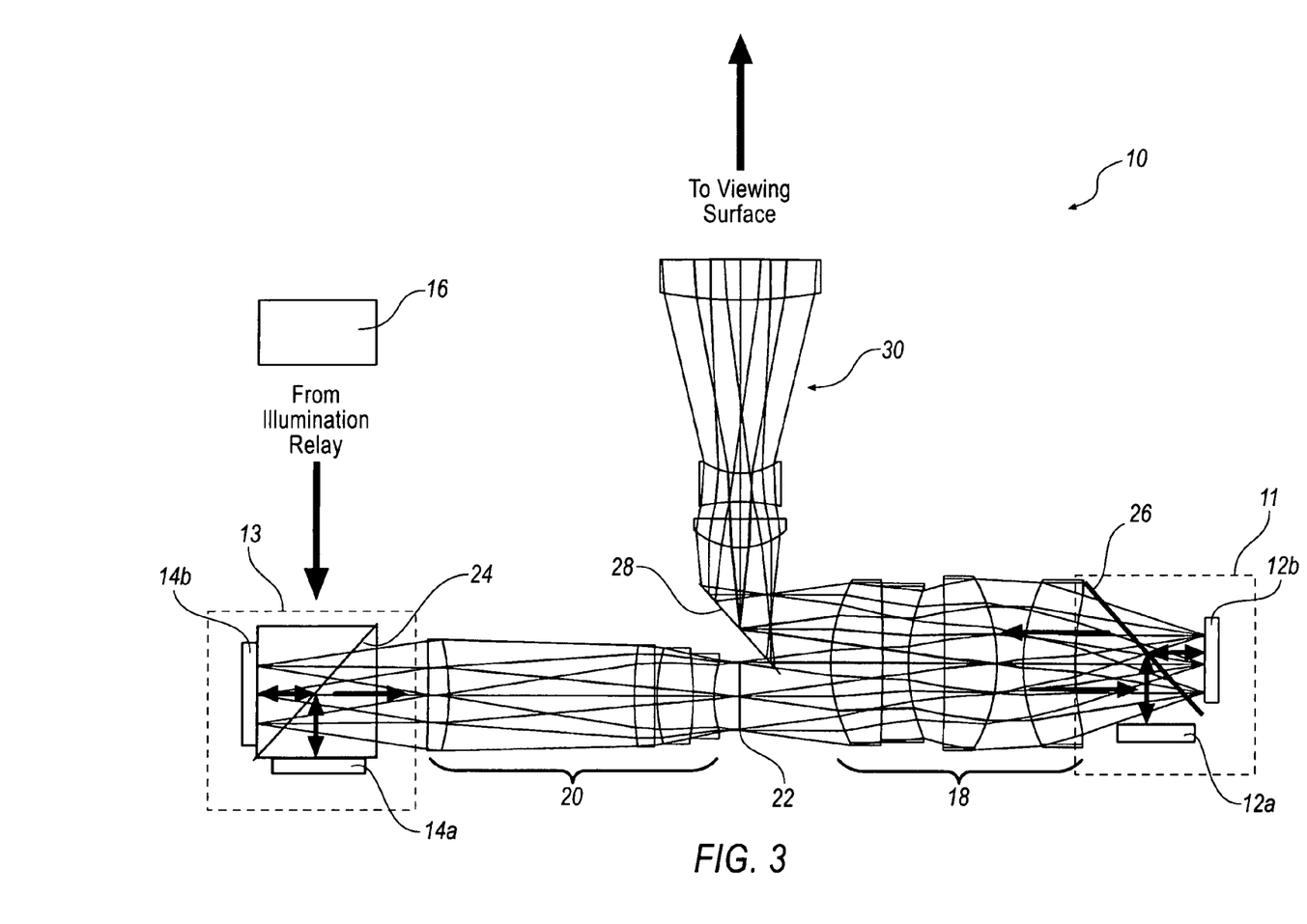
FIG. 3 is an optical schematic of a projection system according to an alternative embodiment.

Several variations of the embodiment of the projection system described in connection with FIG. 1 are possible. For example, as shown in FIG. 3, the system may employ all of the same components as described in FIG. 1, but the "order" of the chromaticity/luminosity module 11 and the luminosity module 13 may be reversed. That is, white light from a light source 16 may be modulated by a luminosity module 13 to generate a gray scale light image first, and the light image can modulated by a chromaticity/luminosity module 11 to add color to the light image second. Reversing the order of the chromaticity/luminosity module 11 and the luminosity module 13 may improve the thermal performance of the system.

Further, in some embodiments that do not make full use of the capabilities of the first relay lens group 18, the first relay lens group 18 may be omitted from the system, which has the benefit of minimizing contrast loss due to stray reflections off of the lens group 20.

Figure 4:
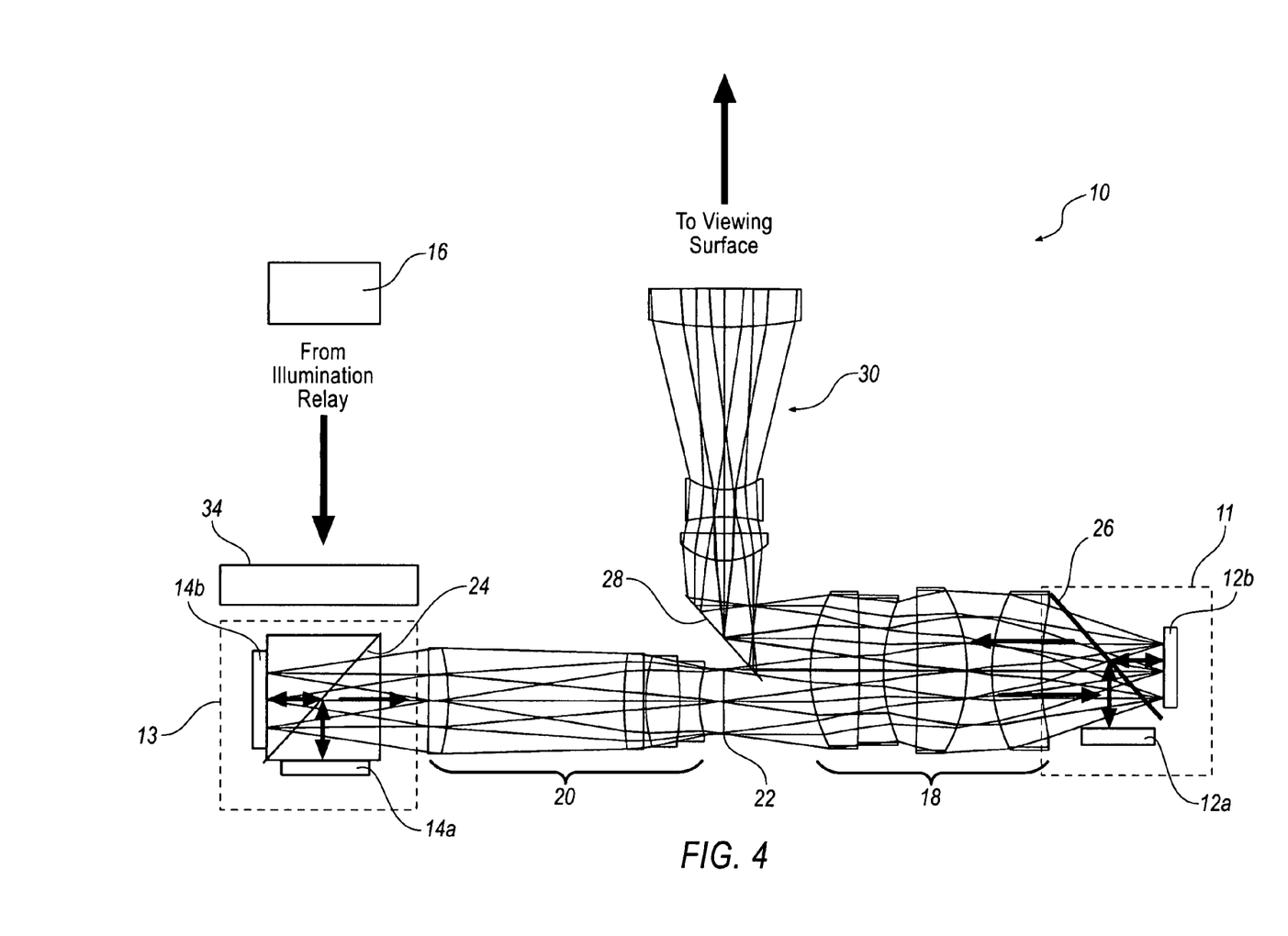
FIG. 4 is an optical schematic of a projection system according to a third embodiment.

FIG. 4 illustrates yet another embodiment of the projection system 10, wherein a polarizer 34, such as a wire grid, stacked plate polarizer, or polarization recovery system is disposed upstream of the luminosity module 13, and particularly the polarizing beamsplitter 24 to provide multiple operating modes. The polarizer 34 will restrict the light in the P-state without appreciably attenuating the S-state, which may cut illumination brightness in half, but increases the contrast. Contrast is increased because the primary loss of contrast is the P-state leakage that occurs in the PBS 24 and the fact that the luminosity modulators 14a, 14b are polarization modulators. Only a partial attenuation of the P-state polarization is required to significantly increase contrast. For example, a 50% reduction of the P-state yields a 100% increase in contrast, with only a 25% overall loss in brightness. With the increased contrast, projection system 10 may be used in a theater mode. In this manner, projection system 10 may be used both in a presentation mode, requiring higher brightness, and a theater mode, requiring higher contrast, thereby increasing the flexibility of the projection system.

Figure 5:
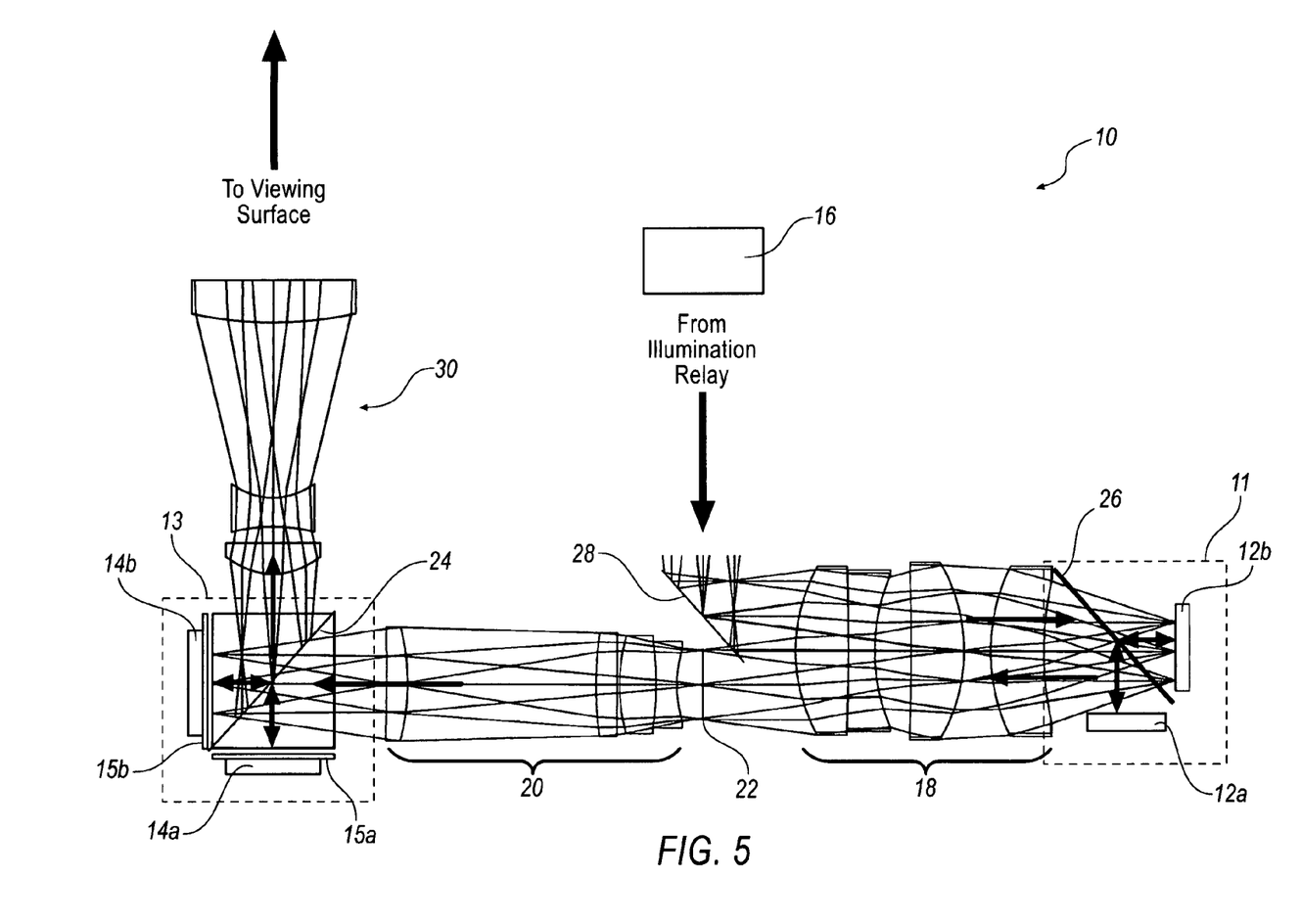
FIG. 5 is an optical schematic of a projection system according to a fourth embodiment.

Another embodiment of the projection system 10 is illustrated in FIG. 5. In this embodiment, luminosity modulators 14a, 14b may be non-polarization based luminosity/chromaticity modulators, such as a pixelated, variable absorption backplane. If non-polarization based luminosity/chromaticity modulators are used, then quarter-wave phase retarders 15a, 15b may be used in front of the luminosity/chromaticity modulators 14a, 14b to allow recombination of the images from the two modulators. The luminosity module still uses polarization to direct the S-state to one modulator, and the P-state to the other modulator, but the contrast of the module is not now limited by the P-state leakage of the PBS. When PBSs are used with polarization based modulators, such as LCOS modulators, the contrast is limited by the P-state leakage of the PBS. When PBSs are used with variable absorption backplanes and quarter wave plates, the P-state leakage only reduces the light output to the projection lens, but not the contrast. The above embodiment could use sequential color, for example by using colorwheels or LEDs, to provide the chromaticity modulation, and the luminosity modulator could provide the spacial luminosity modulation. Because this configuration uses both the S and P states, it allows high efficiency, on-axis, optical operation without the usual limitations associated with polarization based systems, such as low contrast due to P-state leakage and the need for polarization recovery systems.

Figure 6A:
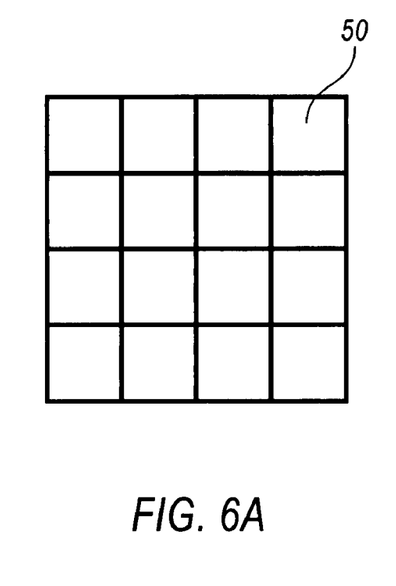
FIGS. 6a-6c illustrate high resolution sub-pixels formed by offsetting the luminosity modulators illustrated in other embodiments of the projection system shown in FIGS. 1, 3, 4 and 5.
Figure 6B:
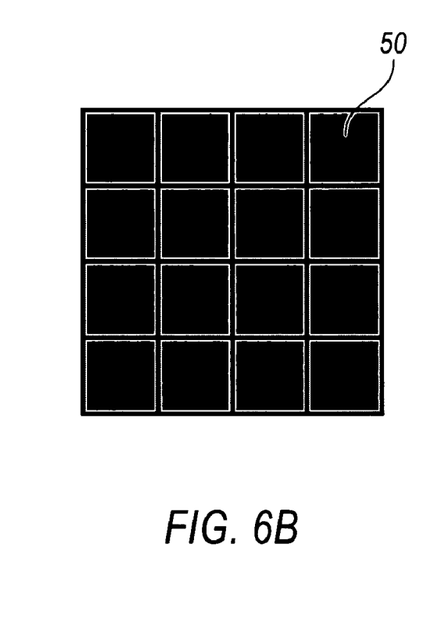
Figure 6C:
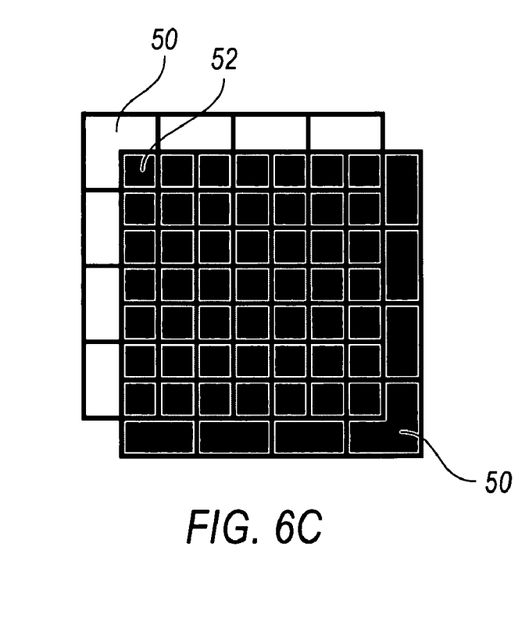

The parallel arrangement of two luminosity modulators 14a, 14b, as is illustrated in the above-described embodiments, enables yet another embodiment that can significantly increase system resolution. Specifically, the luminosity modulators 14a, 14b can be offset from each other by approximately ½ pixel, creating approximately four sub-pixels for each of the original pixels, thereby increasing the resolution of the system. By shifting one of the luminosity modulators approximately ½ pixel with respect to the other luminosity modulator in the X and Y directions, the resolution of the system can be essentially doubled. This is shown in FIGS. 6a, 6b, and 6c. FIGS. 6a and 6b each show a single luminosity modulator, one with light pixels 50 and the other with dark pixels 50. FIG. 6c shows the luminosity modulators of FIGS. 6a and 6b combined in a luminosity modulator and offset by approximately ½ pixel relative to each other to create sub-pixels 52. The brightness of each sub-pixel 52 is the sum of the brightness of the pixels 50 that overlap to create the sub-pixel 52. If the sub-pixel brightness is generated by interpolating the original source data, resolution exceeding the original source data can be realized. Because the human eye primarily perceives resolution as coming from luminosity, the lower resolution of the chromaticity component should not significantly affect the perceived resolution. By shifting one modulator with respect to the other, the visibility of the non-active interpixel area is also minimized. This reduces the so called "screen door" effect. This method of increasing resolution is referred to as "static-wobulation" to differentiate it from the method of increasing resolution known as wobulation, where a projected image is shifted temporally using vibrating mirrors or lenses. Static-wobulation does not require the addition of the above luminosity/chromaticity spacial light modulator module to be useful. If the chromaticity of the illumination is modulated in a sequential color fashion, for example by using colorwheels or LEDs, the static-wobulated spacial luminosity module can be the only spacial light modulator required.

While the present invention has been particularly shown and described with reference to the foregoing preferred embodiment, it should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiment is illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A projector system, comprising:
    a chromaticity/luminosity module having a pair of chromaticity/luminosity modulators configured to modulate incident light such that each frame of light exiting said chromaticity/luminosity module generates a full color image, and each pixel of the frame is of a desired color according to said full color image; and
    a luminosity module having a pair of luminosity modulators configured to receive said full color image from said chromaticity/luminosity module and modulate the intensity of said full color image, said luminosity module being in serial optical communication with said chromaticity/luminosity module.

2. The system of claim 1, wherein said chromaticity/luminosity module receives white light from a light source and projects colored light to said luminosity module.

3. The system of claim 1, wherein said luminosity module receives white light from a light source and projects a grayscale light image to said chromaticity/luminosity module.

4. The system of claim 1, wherein said chromaticity/luminosity modulators are non-polarizing.

5. The system of claim 4, wherein said pair of chromaticity/luminosity modulators each include a pixelated, variable absorption backplane.

6. The system of claim 5, wherein said pair of chromaticity/luminosity modulators further include individual pixels having a top reflector and a bottom reflector separated by a variable distance that defines an optical cavity therebetween.

7. The system of claim 6, wherein said variable distance is adjustable in response to an image source signal to reflect light having a desired wavelength from said chromaticity/luminosity modulator.

8. The system of claim 1, wherein said pair of luminosity modulators comprise liquid crystal on silicon (LOoS) microdisplays.

9. The system of claim 1, wherein said luminosity modulators comprise non-polarizing spacial light modulators, and wherein said luminosity module further includes a pair of quarter-wave phase retarders positioned in front of said non-polarizing spacial light modulators.

10. The system of claim 1, wherein said pair of chromaticity/luminosity modulators are each configured to modulate light of a different range of wavelengths.

11. The system of claim 1, wherein said chromaticity/luminosity module further includes a dichroic beam splitter to divide impending light into a plurality of groups based upon the wavelengths of the light.

12. The system of claim 1, wherein said pair of luminosity modulators are each configured to modulate light of a different polarization.

13. The system of claim 1, wherein said luminosity module further includes a polarizing beam splitter configured to divide impending light into a plurality of polarization states.

14. The system of claim 1, further including a relay lens group disposed between said chromaticity/luminosity module and said luminosity module, and being configured to both direct light to and project light from at least one of said chromaticity/luminosity module and said luminosity module.

15. The system of claim 1, further including a reflecting surface configured to direct light from a light source to one of said chromaticity/luminosity module and said luminosity module, said reflecting surface being substantially aligned with a pupil plane between said chromaticity/luminosity module and said luminosity module.

16. The system of claim 1, further including a polarizer positioned upstream of said luminosity module.

17. The system of claim 1, wherein said luminosity modulators are offset relative to each other such that overlapping pixels of said luminosity modulators generate sub-pixels.

18. The system of claim 17, wherein said luminosity modulators are offset relative to each other approximately one half of a pixel in both an X direction and a Y direction.

19. A method for projecting an image, comprising the steps of:
    receiving and modulating incident light at a chromaticity/luminosity module, said chromaticity/luminosity module including a pair of chromaticity/luminosity modulators configured to modulate said incident light such that each frame of light exiting said chromaticity/luminosity module generates a full color image and each pixel of the frame is of a desired color according to said full color image; and
    receiving and modulating the intensity of said full color image received by said chromaticity/luminosity module at a luminosity module, said luminosity module including a pair of luminosity modulators, to generate a desired light image.

20. The method of claim 19, wherein said incident light at said chromaticity/luminosity module is white light, and said chromaticity/luminosity module optically communicates colored light to said luminosity module.

21. The method of claim 19, wherein said incident light at said luminosity module is white light, and said luminosity module optically communicates a grayscale light image to said chromaticity/luminosity module.

22. The method of claim 19, further comprising the step of directing incident light to and projecting modulated light from at least one of said chromaticity/luminosity module and said luminosity module using a single relay lens group.

23. The method of claim 19, wherein said step of receiving and modulating incident light at said chromaticity/luminosity module comprises dividing said incident light into a plurality of groups based upon wavelength and directing each said group to a respective chromaticity/luminosity module.

24. The method of claim 23, wherein said step of receiving and modulating incident light at said chromaticity/luminosity module further comprises recombining said groups of light after they have been modulated by said respective modulator.

25. The method of claim 19, wherein said step of receiving and modulating incident light at said luminosity module comprises dividing said incident light into a plurality of polarization states and directing light of each said polarization state to a respective luminosity modulator.

26. The method of claim 25, wherein said step of receiving and modulating incident light at said luminosity module comprises recombining said light of different polarization states after said polarized light has been modulated by said respective modulator.

27. The method of claim 19, wherein said luminosity modulators are offset relative to each other, and said luminosity modulators thereby generate subpixels.

28. A projector system, comprising:
- a first means for modulating incident light and a second means for modulating incident light, said first and second means modulate incident light such that each frame of light exiting said first and second means generates a full color image and each pixel of the frame is of a desired color according to said full color image; and
- a third means for modulating incident light and a fourth means for modulating incident light, said third and fourth means are configured to modulate the intensity of said full color image received by said first and second means to collectively generate a light image;

wherein said first and second means for modulating incident light are in optical communication with said third and fourth means for modulating light.

* * * * *

UNITED STATES PATENT AND TRADEMARK OFFICE
CERTIFICATE OF CORRECTION

PATENT NO. : 7,527,381 B2 Page 1 of 1
APPLICATION NO. : 11/192912
DATED : May 5, 2009
INVENTOR(S) : Arthur Piehl et al.

It is certified that error appears in the above-identified patent and that said Letters Patent is hereby corrected as shown below:

In column 7, line 54, in Claim 8, delete "LOoS" and insert -- LCoS --, therefor.

Signed and Sealed this

Twenty-ninth Day of September, 2009

David J. Kappos
*Director of the United States Patent and Trademark Office*